(12) United States Patent
Hess (10) Patent No.: US 9,771,154 B2
(45) Date of Patent: Sep. 26, 2017

(54) SEAT POWER SYSTEMS AND METHODS

(71) Applicant: BAE Systems Information and Electronic Systems Integration Inc., Nashua, NH (US)

(72) Inventor: Robert A. Hess, Newark Valley, NY (US)

(73) Assignee: BAE Systems Controls Inc., Endicott, NY (US)

(*) Notice: Subject to any disclaimer, the term of this patent is extended or adjusted under 35 U.S.C. 154(b) by 359 days.

(21) Appl. No.: 14/397,505

(22) PCT Filed: Feb. 28, 2014

(86) PCT No.: PCT/US2014/019391
§ 371 (c)(1),
(2) Date: Oct. 28, 2014

(87) PCT Pub. No.: WO2014/134433
PCT Pub. Date: Sep. 4, 2014

(65) Prior Publication Data
US 2015/0123464 A1    May 7, 2015

Related U.S. Application Data

(60) Provisional application No. 61/770,589, filed on Feb. 28, 2013.

(51) Int. Cl.
B64D 11/06 (2006.01)
B60N 2/02 (2006.01)
H02J 13/00 (2006.01)

(52) U.S. Cl.
CPC ......... B64D 11/06 (2013.01); B64D 11/0624 (2014.12); B64D 11/06395 (2014.12);
(Continued)

(58) Field of Classification Search
USPC ............................................. 307/9.1
See application file for complete search history.

(56) References Cited

U.S. PATENT DOCUMENTS 3,300,648 A   1/1967   Rockefeller, Jr. et al.
3,538,391 A   11/1970  Bensley et al.
(Continued)

FOREIGN PATENT DOCUMENTS

CN    101068080 B    9/2010
EP    0 409 226 A2   7/1990
(Continued)

OTHER PUBLICATIONS

Durda, F., "Serial and UART Tutorial", https://www.freebsd.org/doc/en/articles/serial-uart/, dated Jan. 13, 1996, Accessed on Sep. 11, 2015, 21 pages.
(Continued)

Primary Examiner — Rexford Barnie
Assistant Examiner — Xuan Ly
(74) Attorney, Agent, or Firm — Scully Scott Murphy & Presser (57) ABSTRACT

Various embodiments of the present invention relate to an intelligent seat power system in which a plurality of seat nodes are embedded in respective aircraft seats. The seat nodes receive power and commands from a plurality of power supply units, each of which is connected to a cabin management system. The seat nodes are able to monitor and control functionality at the seat, and communicate their status back to the cabin management system.

10 Claims, 6 Drawing Sheets

(52) U.S. Cl.
CPC ..... *B60N 2002/0264* (2013.01); *H02J 13/002* (2013.01); *Y02T 50/46* (2013.01)

(56) References Cited

U.S. PATENT DOCUMENTS

| | | |
|---|---|---|
| 4,064,485 A | 12/1977 | Leyde |
| 4,075,699 A | 2/1978 | Schneider et al. |
| 4,100,426 A | 7/1978 | Baranowski et al. |
| 4,215,276 A | 7/1980 | Janeway |
| 4,216,384 A | 8/1980 | Hurley |
| 4,324,987 A | 4/1982 | Sullivan, II et al. |
| 4,347,472 A | 8/1982 | Lemelson |
| 4,410,935 A | 10/1983 | Dang |
| 4,435,650 A | 3/1984 | Dziubakowski et al. |
| 4,471,232 A | 9/1984 | Peddie et al. |
| 4,538,073 A | 8/1985 | Freige et al. |
| 4,577,144 A | 3/1986 | Hodgman et al. |
| 4,644,320 A | 2/1987 | Carr et al. |
| 4,659,942 A | 4/1987 | Volp |
| 4,729,086 A | 3/1988 | Lethellier |
| 4,771,185 A | 9/1988 | Feron et al. |
| 4,876,496 A | 10/1989 | Duncan |
| 4,888,495 A | 12/1989 | Feron et al. |
| 4,935,642 A | 6/1990 | Obelode et al. |
| 5,038,265 A | 8/1991 | Paladel |
| 5,202,617 A | 4/1993 | Nor |
| 5,267,135 A | 11/1993 | Tezuka et al. |
| 5,297,015 A | 3/1994 | Miyazaki et al. |
| 5,327,066 A | 7/1994 | Smith |
| 5,350,993 A | 9/1994 | Toya et al. |
| 5,422,624 A | 6/1995 | Smith |
| 5,462,439 A | 10/1995 | Keith |
| 5,471,190 A | 11/1995 | Zimmermann |
| 5,499,181 A | 3/1996 | Smith |
| 5,548,200 A | 8/1996 | Nor et al. |
| 5,565,755 A | 10/1996 | Keith |
| 5,569,993 A | 10/1996 | Keith |
| 5,572,109 A | 11/1996 | Keith |
| 5,583,419 A | 12/1996 | Haller |
| 5,598,084 A | 1/1997 | Keith |
| 5,606,245 A | 2/1997 | Kirby |
| 5,666,291 A | 9/1997 | Scott et al. |
| 5,696,367 A | 12/1997 | Keith |
| 5,717,374 A | 2/1998 | Smith |
| 5,742,229 A | 4/1998 | Smith |
| 5,745,159 A | 4/1998 | Wax et al. |
| 5,754,445 A | 5/1998 | Jouper et al. |
| 6,016,016 A * | 1/2000 | Starke ............... B64F 5/60 307/38 |
| 6,046,513 A | 4/2000 | Jouper et al. |
| 6,249,913 B1 | 6/2001 | Galipeau et al. |
| 6,921,987 B2 | 7/2005 | Marin-Martinod |
| 7,514,812 B2 | 4/2009 | Krug |
| 8,082,569 B2 | 12/2011 | Brady, Jr. et al. |
| 2002/0136039 A1 | 9/2002 | Leynaert |
| 2002/0153776 A1 | 10/2002 | Elliott |
| 2003/0208764 A1* | 11/2003 | Galipeau ............ H04N 7/17318 725/76 |
| 2007/0259545 A1 | 11/2007 | Berenger |
| 2010/0193630 A1 | 8/2010 | Duces et al. |
| 2011/0184579 A1 | 7/2011 | Nilsen et al. |
| 2013/0026825 A1 | 1/2013 | Savage et al. |

FOREIGN PATENT DOCUMENTS

| | | |
|---|---|---|
| EP | 14756694 | 10/2016 |
| FR | 2887051 | 12/2006 |
| WO | PCT/US2014/019391 | 2/2014 |

OTHER PUBLICATIONS

Microchip, Section 21. UART, 2007-2012 Microchip Technology, Inc. 42 pages.

Microprocessor and Microcomputer Standards Committee of the IEEE Computer Society, "IEEE Standard for a High Performance Serial Bus" The Institute of Electrical and Electronics Engineers, Inc., (1996), pp. i-384.

Marais, H., "Inside iCoupler Technology-Isolated RS-485", Analog Devices, (2013), 2 pages.

Axelson, J., "Designing RS-485 Circuits", Circuit Cellar, (Jun. 1999), Issue 107, pp. 20-24.

"Annex J PHY-link interface specification", IEEE Standard for A, (1995), pp. 342-358.

"Hitachi Inverter Instruction Manual, HFC-VWS3 U (H) Series", HALS, (Feb. 26, 1992), 89 pages.

Stamper, D.A., et al., "Local area networks", Addison Wesley Longman, Inc., (1998), 6 pages.

Medical Information Bus Committee of the IEE Engineering in Medicine and Biology Society, "IEEE Standard for Medical Device Communications—Physical Layer Interface-Cable Connected", The Institute of Electrical and Electronics Engineers, Inc., (1994), 72 pages.

* cited by examiner

SEAT POWER SYSTEMS AND METHODS

RELATED APPLICATION

The present application claims the benefit of U.S. provisional patent application 61/770,589, filed Feb. 28, 2013, the entire content and disclosure of which is incorporated herein by reference.

BACKGROUND OF THE INVENTION

Field of the Invention

Various embodiments of the present invention relate to in-seat power systems (for example, for passenger aircraft) whereby power is provided to electronic components mounted in passenger seats and/or to electronic devices such as may be used by a passenger while in a seat (e.g., personal electronic devices).

Description of Related Art

Conventionally, power is typically distributed to passenger seats using a network of master control electronic units and in-seat power supplies. Each master control unit distributes and monitors the power to a network of in-seat power supplies. For aircraft applications, this distributed power is typically 115 VAC, 400 Hz power. The in-seat power supplies convert this received 115 VAC, 400 Hz power into 110 VAC, 60 Hz power and/or 15 VDC power. The in-seat power supplies then distribute the 110 VAC, 60 Hz power and/or 15 VDC power to outlets and electronic assemblies (video display units, etc.) mounted in each seat.

Each master control electronic unit is typically connected to an in-flight entertainment (IFE) system. Each master control electronic unit is able to respond to specific commands to shutdown power to the in-seat power supplies. The in-seat power supplies can communicate to the master control electronic units via a digital communications bus.

Because the conversion from 400 Hz to 60 Hz power is performed at the seat, there is a significant penalty in terms of volume and electronic complexity at the seat for this conversion. This volume typically comes at the expense to legroom under the seat. With the trend to provide more power at the passenger seat in order to power personal electronic devices (PEDs), and for in-seat video monitors, the need for more power conversion is expected to increase.

Further, because the main control conduit for seat power is through the IFE system, any change to the IFE system (or, of course, removal of the IFE system) impacts the seat power solution.

SUMMARY OF THE INVENTION

In one embodiment of the present invention an intelligent seat power system is provided in which a plurality of seat nodes are associated with (e.g., embedded in) aircraft seats. The seat nodes receive power and commands from a plurality of power supplies, each of which is connected to a cabin management system (CMS). The seat nodes are able to monitor and control functionality at the seats, and communicate their status back to the cabin management system.

In one embodiment, a power system for providing power within an aircraft, wherein the aircraft includes a source of AC power having a first frequency above 60 Hz is provided, the power system comprising: a plurality of seat nodes, each of the plurality of seat nodes comprising a microprocessor and an AC monitor and control element; a power supply unit, the power supply unit including a frequency converter subsystem, the frequency converter subsystem being configured to receive power from the source of AC power and to convert the received power having the first frequency into converted power having a second frequency at essentially 60 Hz; a power network configured to provide the converted power from the frequency converter subsystem of the power supply unit to the plurality of seat nodes, wherein the AC monitor and control element of each of the plurality of seat nodes is configured to monitor the converted power received from the frequency converter subsystem of the power supply unit and to control the received converted power as output power that is output from each of the plurality of seat nodes; and a data network configured to communicate data between the power supply unit and each of the plurality of seat nodes.

In another embodiment, a method for providing power within an aircraft, wherein the aircraft includes a source of AC power having a first frequency above 60 Hz is provided, the method comprising: providing a plurality of seat nodes, each of the plurality of seat nodes comprising a microprocessor and an AC monitor and control element; providing a power supply unit, the power supply unit including a frequency converter subsystem, the frequency converter subsystem being configured to receive power from the source of AC power and to convert the received power having the first frequency into converted power having a second frequency at essentially 60 Hz; providing a power network configured to provide the converted power from the frequency converter subsystem of the power supply unit to the plurality of seat nodes, wherein the AC monitor and control element of each of the plurality of seat nodes is configured to monitor the converted power received from the frequency converter subsystem of the power supply unit and to control the received converted power as output power that is output from each of the plurality of seat nodes; and providing a data network configured to communicate data between the power supply unit and each of the plurality of seat nodes.

BRIEF DESCRIPTION OF THE DRAWINGS

The drawings are provided for illustrative purpose only and do not necessarily represent practical examples of the present invention to scale. In the figures, the same reference signs are used to denote the same or like parts.

DETAILED DESCRIPTION OF THE INVENTION

For the purposes of describing and claiming the present invention, the term "cabin management system" (or "CMS") is intended to refer to that aircraft system which is used to control and manage basic cabin functions, such as signage and lighting, temperature control, public address, and cabin interphone. Seat power, passenger reading lights and attendant call functions are part of the cabin management system.

One embodiment of the present invention provides an integrated seat power solution, thereby avoiding various problems of the conventional mechanisms while providing new capabilities. Unlike the conventional mechanisms, various embodiments perform the power conversion in dedicated converters in each of a plurality of zones of the aircraft. Each converter then provides power (e.g., 60 Hz power) to a network of seat nodes. Each seat node is equipped with a microprocessor and the requisite circuitry for digital communication to electronic component(s) in the seat, as well as providing discrete input monitor(s) to monitor switch settings in the seat (e.g., reading light control, attendant call functions, etc.). In another example, the switch positions may be communicated to the seat nodes via a digital interface instead of a discrete interface. The seat nodes perform monitoring and control of the power to various connected electronic component(s). The seat nodes communicate with power supply units including the converters, which in turn, communicate with the cabin management system. Control of the seat power can then be accomplished by the cabin management system, which is also connected to the other main power consumers in the cabin (e.g., lighting and galleys), thereby allowing full monitoring and control of cabin power. As the power conversion is done in a converter which need not be mounted in the seat, more room (e.g., legroom) is made available for the passengers.

Figure 1:
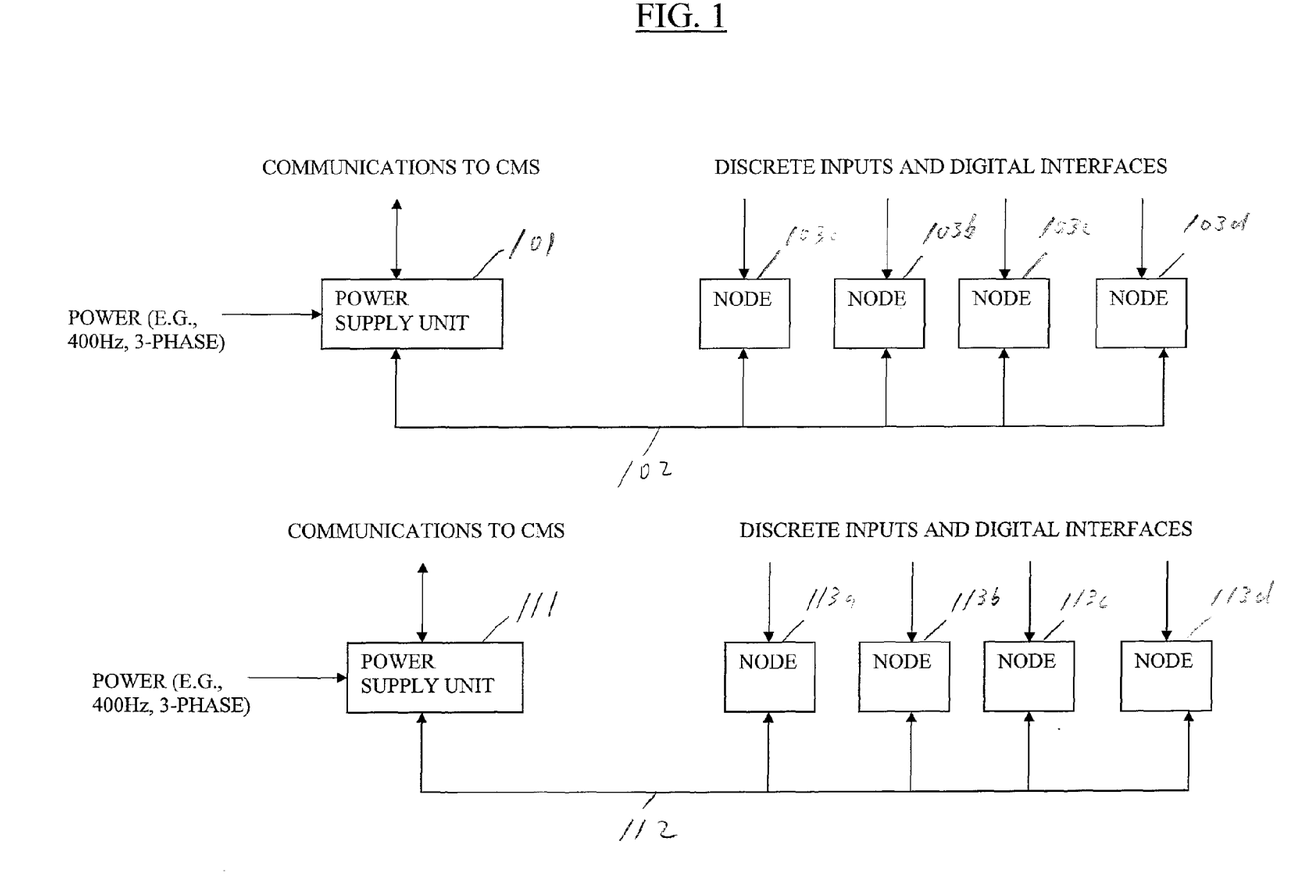
FIG. 1 is a block diagram of a power system according to an embodiment of the present invention.

Referring now to FIG. 1, an example system implementation is shown. As seen in FIG. 1, power supply unit 101 receives power (e.g., fixed 400 Hz, 3 phase power or 115 VAC variable frequency (360 Hz to 800 Hz) power) from a source of AC power (not shown). The power supply unit 101 is in operative communication with a plurality of seat nodes 103a-103d (of note, while these four seat nodes are shown in this example, any desired number may be utilized). The power supply unit includes a frequency converter. The power provided from power supply unit 101 to each of seat nodes 103a-103d may be, for example, 60 Hz, 3 phase power). In the example shown, the connections 102 between power supply unit 101 and each of seat nodes 103a-103d may be a bi-directional data-over-power network (e.g., a 110 VAC, 60 Hz data-over-power network). In another example, the connections 102 between power supply unit 101 and each of seat nodes 103a-103d comprises a power network and a separate data network. Further, each of seat nodes 103a-103d may be in operative communication with respective discrete input(s) and/or digital interface(s). In one specific example, each of these discrete inputs may be a user activated switch for use with a seat associated with a given one of seat nodes 103a-103d. Further still, power supply unit 101 may communicate (for example, bi-directionally via RS-485 physical interface) with a cabin management system (not shown). In another example, the ARINC 628 message protocol may be utilized. As seen in this Fig., a single power supply unit supplies multiple seat nodes.

Still referring to FIG. 1, a power supply unit 111 also receives power (e.g., 400 Hz, 3 phase power) from a source of AC power (not shown). Of note, while two power supply units are shown in this example, any desired number may be utilized. In a manner similar to that described above, the power supply unit 111 is in operative communication with a plurality of seat nodes 113a-113d (while these four seat nodes are shown in this example, any desired number may be utilized). The connection and operation of power supply unit 111 and seat nodes 113a-113d is the same as power supply unit 101 and seat nodes 103a-103d.

Figure 2:
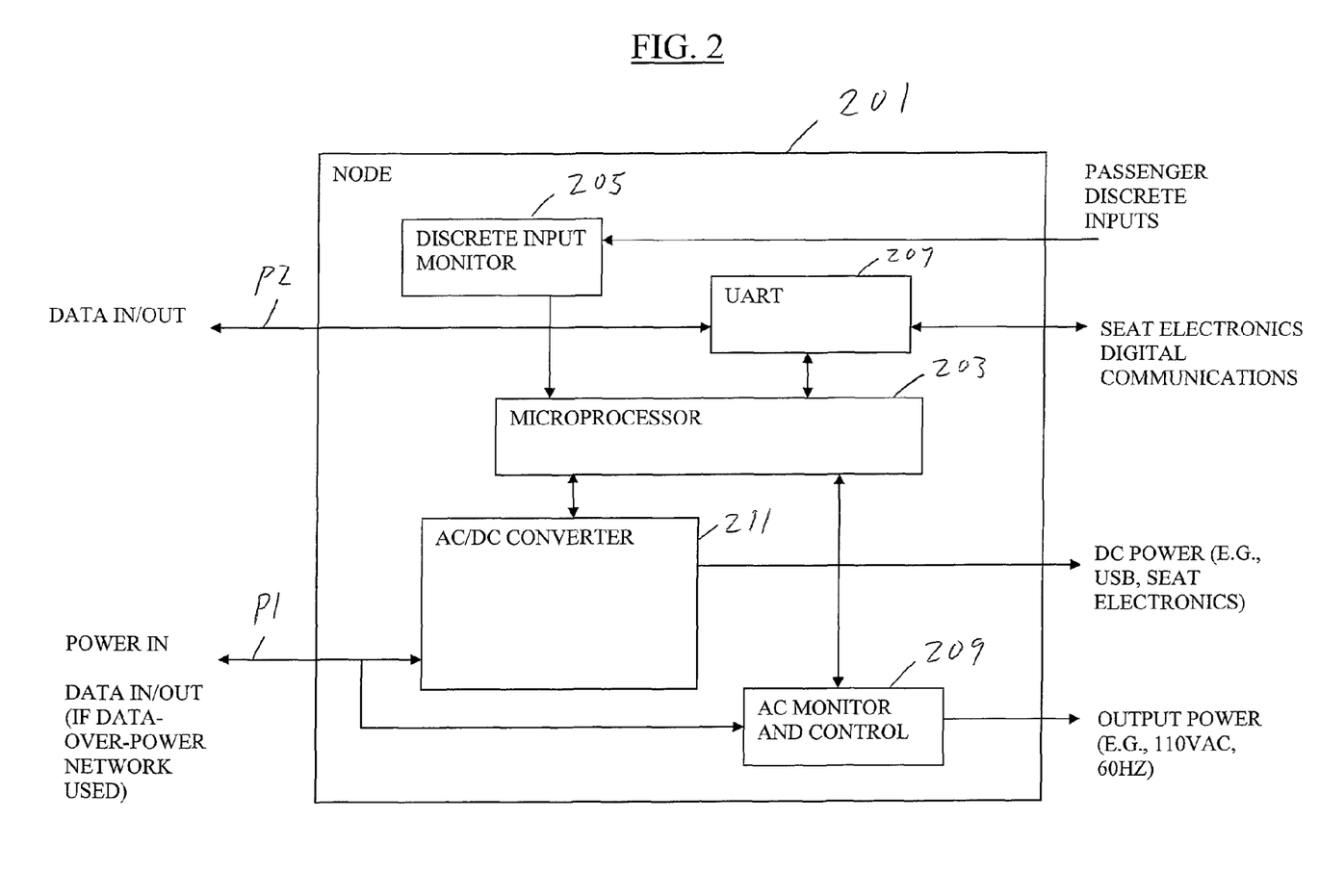
FIG. 2 is a block diagram of a seat node according to an embodiment of the present invention.

Referring now to FIG. 2, an example seat node implementation is shown. As seen in FIG. 2, seat node 201 includes microprocessor 203. In one specific example, the microprocessor may operate in conjunction with firmware and/or software.

Figure 4:
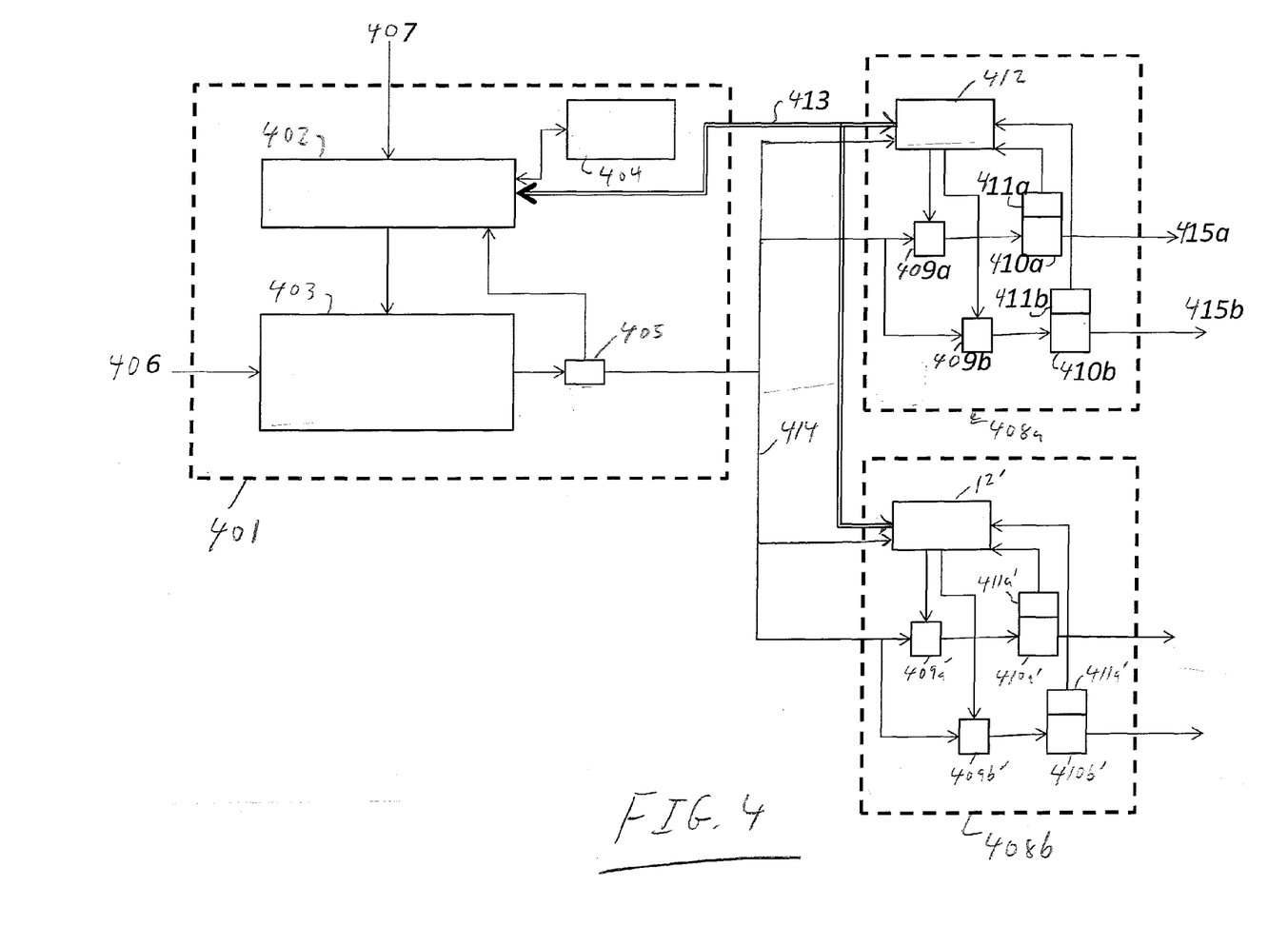
FIG. 4 is a block diagram of a power system according to an embodiment of the present invention.

Still referring to FIG. 2, seat node 201 further includes discrete input monitor 205 (which monitors passenger discrete inputs such as, for example, one or more light switches) and universal asynchronous receiver and transmitter (UART) 207 (which implements seat electronics digital communications as well as other communications). In one specific example, UART 207 utilizes RS-485, CAN, USB, etc.). Further still, seat node 201 includes AC Monitor and Control 209, which outputs AC power received from a power supply unit. In one specific example, the AC power that is received by and output from AC Monitor and Control 209 is 110 VAC, 60 Hz power. In another example, AC Monitor and Control 209 performs its functions by utilizing one or more relays and/or one or more plug presence sensing elements (see e.g., 409a, 409b, 410a, 410b, 411a and 411b of FIG. 4 showing further details of AC Monitor and Control 209).

In addition, seat node 201 further includes AC to DC Converter 211. This AC to DC Converter 211 outputs DC power after conversion of AC power received from the power supply unit. In one specific example, this AC to DC Converter 211 receives 110 VAC, 60 Hz power and outputs 15V DC power and/or 5 VDC power (e.g., for use in connection with USB, seat electronics, etc). The AC to DC Converter 211 may also perform as a data-over-power interface (e.g., for transmitting and/or receiving data to and/or from a power supply unit over the power network via which the power supply unit provides the power to the seat node 201). The AC to DC Converter 211 also provides DC monitor and control functions In one example, the AC to DC Converter 211 always provides power (e.g., for use by the microprocessor and for output).

In one specific example, data may be communicated (e.g., sent to and received from a power supply unit) using a data-over-power network via path P1). In another specific example, data may be communicated (e.g., sent to and received from a power supply unit) using a data network via path P2). In another specific example, data may be communicated (e.g., sent to and received from a power supply unit) using a data network via one or more paths including microprocessor 203).

In one example, each seat node is integrated with a universal outlet. In another example, personal electronic devices ("PEDs") can be plugged into the seat node, which is embedded in the seat (e.g., armrest, seatback, etc.). In another example, the outlet can provide 110 VAC, 60 Hz power and/or 15 VDC power and/or 5 VDC power (e.g., for USB-based devices).

In another example, each seat node provides a distinct power connection to other seat-mounted electronics. The power for these electronics is separately controllable from the outlet power. This allows the seat node to disable power to the outlet(s) when appropriate (e.g., during taxi, takeoff and landing), but still allow video displays to show required safety videos while on the ground.

Figure 3:
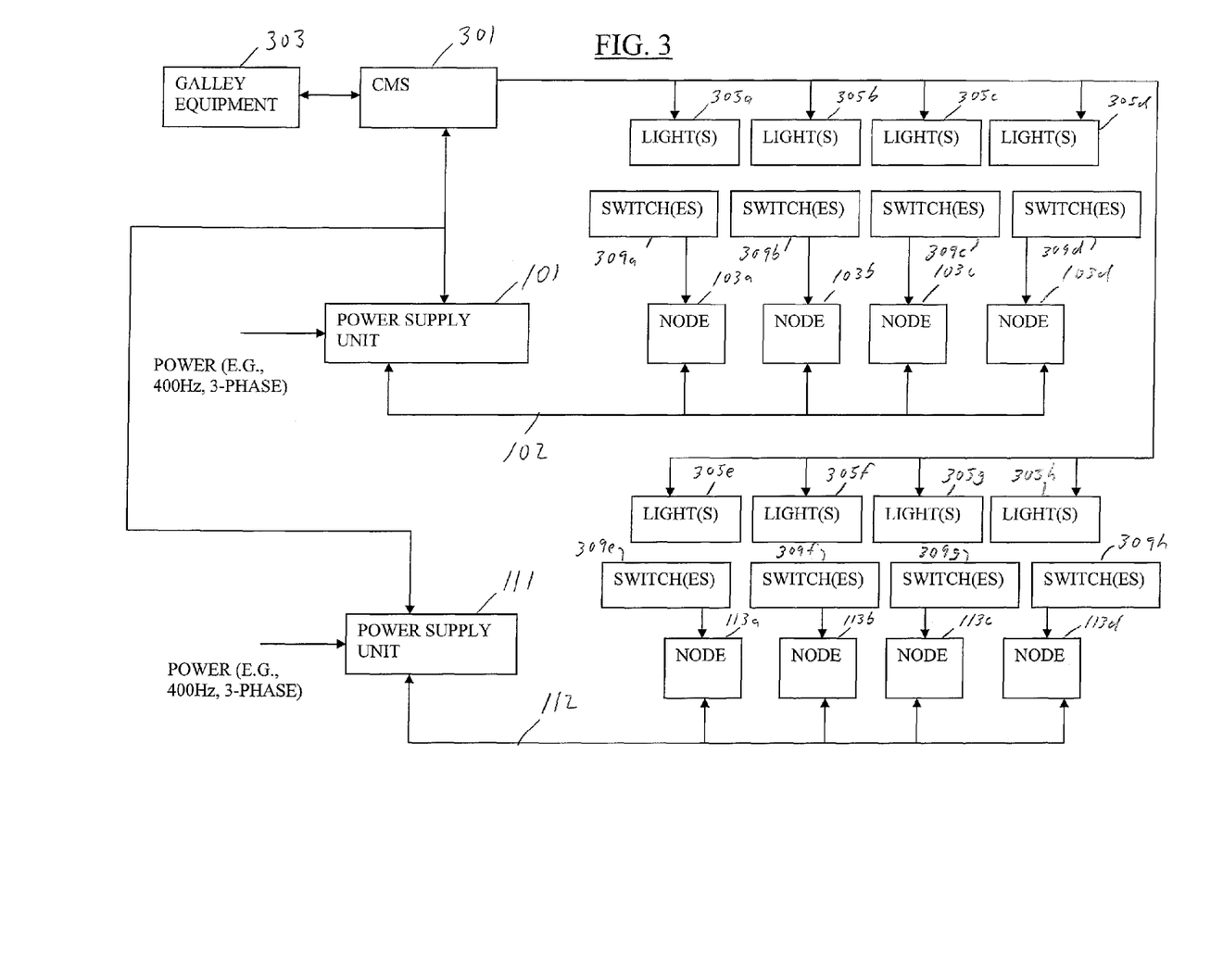
FIG. 3 is a block diagram of a power system according to an embodiment of the present invention.

Referring now to FIG. 3, an example system implementation is shown. As seen in FIG. 3, power supply unit 101, power supply unit 111, connections 102, connections 112, seat nodes 103a-103d and seat nodes 113a-113d of the types shown in FIG. 1 are provided. Also provided in this example are cabin management system 301, galley equipment 303, passenger reading lights and/or attendant call lights 305a-305h (each of which corresponds to a seat associated with a respective one of seat nodes 103a-103d and seat nodes 113a-113d), and passenger seat switches 309a-309h (each of which corresponds to a seat associated with a respective one of seat nodes 103a-103d and seat nodes 113a-113d). In use, the passengers may operate the respective passenger seat switches 309a-309h to cause the illumination (or extinguishing), via cabin management system 301, each of respective ones of passenger reading lights and/or attendant call lights 305a-305h. That is, based upon operation by passengers of respective ones of seat switches 309a-309d, data is sent from the corresponding one of seat nodes 103a-103d to power supply unit 101 and on to cabin management system 301 in order to control the corresponding one of passenger reading lights and/or attendant call lights 305a-305d. Similarly, based upon operation by passengers of respective ones of seat switches 309e-309h, data is sent from the corresponding one of seat nodes 113a-113d to power supply unit 111 and on to cabin management system 301 in order to control the corresponding one of passenger reading lights and/or attendant call lights 305e-305h. In one specific example, a single switch (e.g., a multi-way switch) may be provided to control a respective passenger reading light and attendant call light. In another specific example, a single switch may be provided to control a respective passenger reading light and a single switch may be provided to control a respective attendant call light.

In another example, the cabin management system is able to control the level of power based on the state of the aircraft. These commands would be passed from the cabin management system to each power supply unit and on to the seat nodes. The seat nodes would then control the various power settings (e.g., None, Electronics Enabled, Outlets Enabled). Each seat node would be able to monitor its own voltage and/or current levels, and provide over-voltage and/or over-current protection and reporting as well as ground fault monitoring/reporting. In one specific example, an action to be taken by a seat node in response to such monitoring would be to open the relay(s) associated with the seat node. In another specific example, the AC Monitor and Control 209 of FIG. 2 may carry out such monitoring/reporting using a seat node controller 412 such as described below (that is, seat node controller 412 may have voltage monitoring/overvoltage protection; current monitoring/overcurrent protection and/or ground fault monitoring/ground fault protection).

In one example, each seat node is able to monitor passenger switch setting (e.g., reading light, attendant call). The switch settings can then be sent through the network to the power supply unit and onto the cabin management system which, in this example, is responsible for lighting control.

Referring now to FIG. 4, an example system implementation is shown. Upon startup, a user control 407 is received by power supply unit 401. The user control 407 may be sent from a cabin management system (not shown). This user control 407 allows the system to run. In one specific example, the user control 407 may be a signal in the form of one or more digital messages or one or more input discretes (on/off). Aircraft power 406 is provided as shown.

The power controller 402 controls the frequency converter subsystem 403. This control includes monitoring the total current sensed by the current sense element 405 (which may be in the form of, for example, a circuit and/or microprocessor) as well as other aspects related to power conversion. Power is delivered to the seat nodes 408a, 408b. Any desired number of seat nodes may be connected to a frequency converter output power bus 414. Further, it is noted that seat node 408b includes components similar to seat node 408a (these components of seat node 408b are 409a', 409b', 410a', 410b', 411a', 411b' and 412'). For simplicity, it is noted that the operation of seat node 408b is the same as seat node 408a and that such operation of seat node 408b will not be separately described. These depicted seat nodes 408a and 408b are in some respects simplified representations of seat node 201 of FIG. 2 (not showing, for example, UART 207, discrete input monitor 205, AC/DC converter 211). These depicted seat nodes 408a and 408b do show, however, certain details of AC Monitor and Control 209 of FIG. 2 (for example, outlets, relays and plug presence sense elements discussed below).

In this example, by default, all outlets 410a, 410b are available for use upon normal startup (of course, any desired number of outlets may be associated with a given seat node). Further, in this example, there are no rules within the power controller 402 concerning the size of the electrical loads 415a, 415b.

The seat node 408a sends one or more messages back to the power controller 402 over databus 413 (in one specific example, this may be a digital databus). These messages may include outlet in-use status, power usage metrics, and/or fault data.

As a load 415a or 415b is plugged into a respective outlet 410a or 410b associated with seat node 408a, a respective plug presence sense element 411a or 411b (which may be in the form of, for example, a circuit and/or physical plug detector) sends the status (e.g., plugged-in, not plugged-in) to seat node controller 412 (which may be in the form, for example, of a microprocessor). The seat node controller 412 sends all status over the databus 413 to the power supply unit 401 (in particular, to power controller 402).

If plug presence associated with a specific outlet is in-use, the seat node controller 412 commands a respective relay 409a or 409b to close. Power thus flows to the respective load 415a or 415b.

The power controller 402 logs outlet in-use status to memory 404 in the power supply unit 401. In one example, the logged information includes the time each outlet went in-use and/or came out of use. The power supply unit 401 continues to monitor total current draw. As more loads are connected, the total power usage increases.

The power supply unit 401 monitors total power consumption. If total power consumption exceeds a predefined level, power shedding for the loads on that power supply unit is performed.

The power controller 402 monitors total power consumption based input from the current sense element 405. If the power usage is over a predefined limit, then loads are shed. The first step in this load shedding is to review the in-use information in memory 404. Those loads which have been in-use the longest time are deactivated. Deactivation is performed by sending a specific message to the appropriate seat data node 408a, 408b. The appropriate seat node controller 412,412' opens the appropriate relay (409a, 409b or 409a', 409b') to stop power to the oldest load. The deactivation process is repeated until the total power usage monitored in the power supply unit 401 is below the required threshold.

Assuming that no new loads are connected, the system then performs load sharing. During load sharing, the power supply controller 402 continues to monitor the in-use status of each outlet 410a or 410b. Those outlet(s) which are not deactivated, but are in-use are shed in a first-in, first-out basis. The loads which are connected the longest time are deactivated. In one example, the time period is defined in logic in the power controller 402 using information in memory 404. This information may include, for example, time and average power usage from each connected load. The oldest deactivated load is then reactivated. The process then continues.

In one example, each seat node 408*a*, 408*b* may comprise multiple distinct elements—(i) a controller and relays in a single unit and, in a separate unit, (ii) one or more outlets with the associated plug presence element(s). In another example, the seat nodes 408*a*, 408*b* always receive power via frequency converter output power bus 414. In another example, light control message(s) such as from a cabin management system may be sent via user control 407 through 402 to 412, 412'. In another example, in a pay for power system one or more outlets (and/or USB ports) may be activated/deactivated by a seat node based upon a message from a cabin management system sent via user control 407 through 402 to 412, 412'.

In another example, the design of the system may be such that each seat node can be configured to work without the specific power supply unit described herein. In such a case, any power supply unit can make the required power, and each seat node would manage its relays on its own using plug presence. Thus, in this example, a deactivation signal from an outside source to a seat node to stop power supply to an outlet is not necessary.

In various examples described herein, the power supply unit is always sending power to each seat node (because in these examples, each seat node needs power to operate its controls, etc.). Under normal (non-faulted) operation, the power supply unit is always supplying power to an associated seat node, irrespective of the actual load(s) connected to the system.

In another example, for a given installation it is assumed that there is only as much total power supply unit power provided as there is aircraft power source (that is, such example installations do not try to manage power usage to keep under the aircraft power budget—the installations are in aircraft power budget by design).

Figure 5:
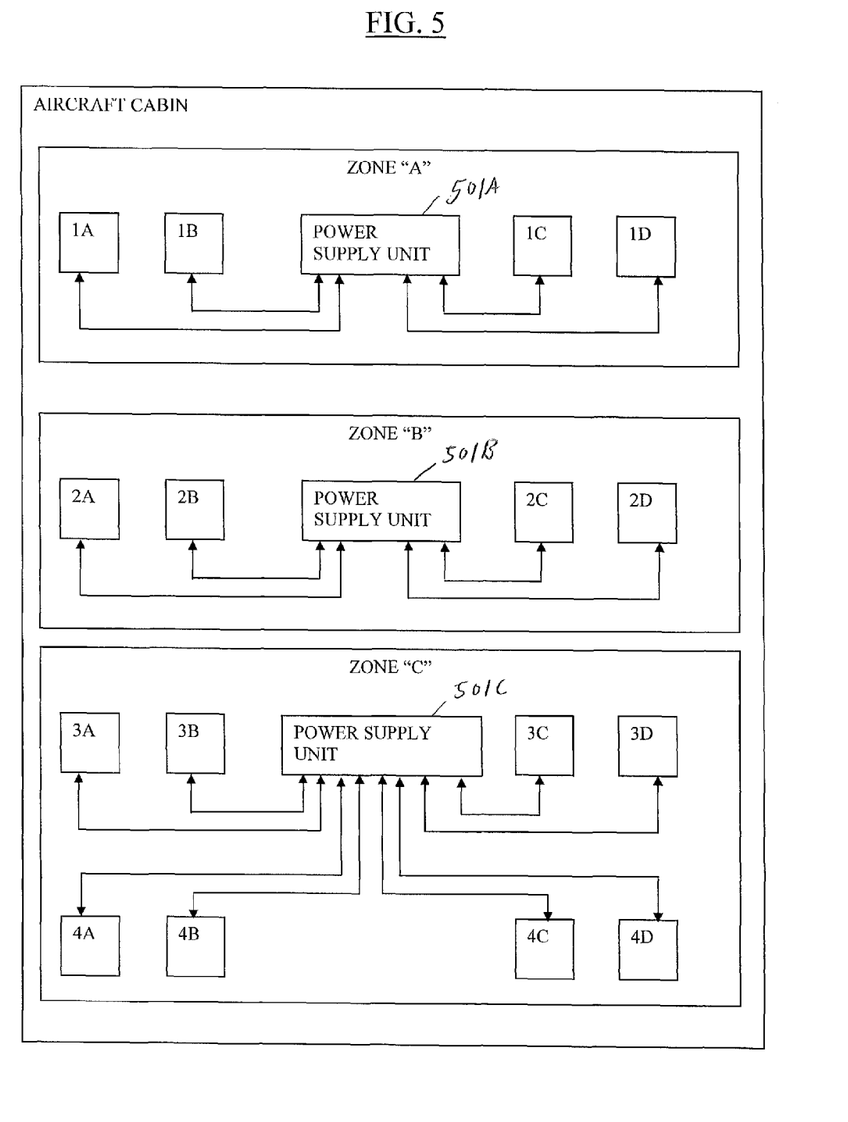
FIG. 5 is a block diagram of a power system according to an embodiment of the present invention.

Referring now to FIG. 5, an example system implementation is shown. As seen in FIG. 5, the aircraft cabin 500 includes seats 1A-1D, 2A-2D, 3A-3D and 4A-4D (of note, while 16 seats are shown, any desired number of seats may be utilized). Each of the seats has associated therewith a respective seat node (not shown). In addition, the aircraft cabin 500 includes power supply units 501A-501C (of note, while 3 power supply units are shown, any desired number of power supply units may be utilized). In this example, the aircraft cabin 500 is divided into 3 zones: zones A, B and C (of note, while 3 zones are shown, any desired number of zones may be utilized). In this example, each of the power supply units 501A-501C and seats 1A-1D, 2A-2D, 3A-3D and 4A-4D (along with the seat's respective seat nodes) are physically located in one of zones A, B and C. That is, in this example: power supply unit 501A and seats 1A-1D (along with the seat's respective seat nodes) are physically located in zone A; power supply unit 501B and seats 2A-2D (along with the seat's respective seat nodes) are physically located in zone B; and power supply unit 501C and seats 3A-3D and 4A-4D (along with the seat's respective seat nodes) are physically located in zone C. Further, in this example: power supply unit 501A provides power to only the group of seat nodes associated with seats 1A-1D; power supply unit 501B provides power to only the group of seat nodes associated with seats 2A-2D; and power supply unit 501C provides power to only the group of seat nodes associated with seats 3A-3D and 4A-4D. In one specific example, each power supply unit may be located in one of the seats of the group to which the power supply unit supplies power. In another specific example, each power supply unit may be located in the crown (overhead) area of the cabin or in an electronics bay. In another specific example, each power supply unit may be located below the floor.

Figure 6:
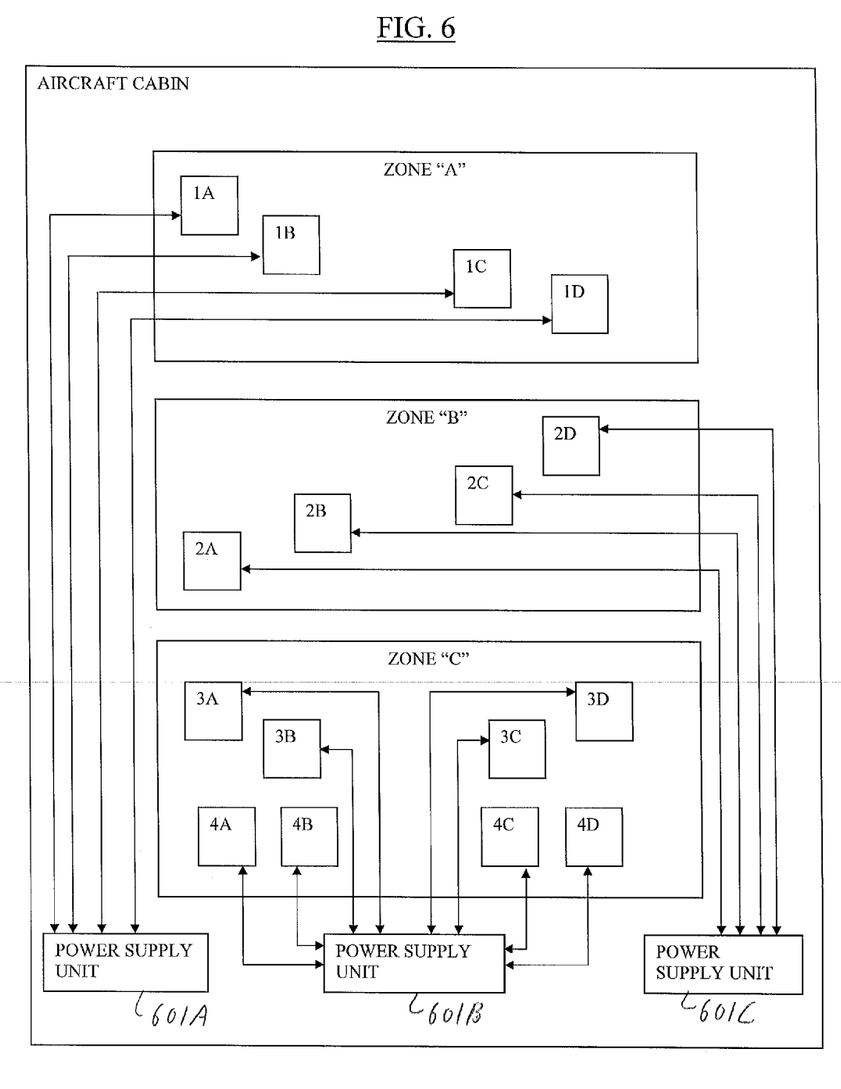
FIG. 6 is a block diagram of a power system according to an embodiment of the present invention.

Referring now to FIG. 6, an example system implementation is shown. As seen in FIG. 6, the aircraft cabin 600 includes seats 1A-1D, 2A-2D, 3A-3D and 4A-4D (of note, while 16 seats are shown, any desired number of seats may be utilized). Each of the seats has associated therewith a respective seat node (not shown). In addition, the aircraft cabin 600 includes power supply units 601A-601C (of note, while 3 power supply units are shown, any desired number of frequency converters may be utilized). In this example, the aircraft cabin 600 is divided into 3 zones: zones A, B and C (of note, while 3 zones are shown, any desired number of zones may be utilized). In this example, each of the seats 1A-1D, 2A-2D, 3A-3D and 4A-4D (along with the seat's respective seat nodes) are physically located in one of zones A, B and C. That is, in this example: seats 1A-1D (along with the seat's respective seat nodes) are physically located in zone A; seats 2A-2D (along with the seat's respective seat nodes) are physically located in zone B; and seats 3A-3D and 4A-4D (along with the seat's respective seat nodes) are physically located in zone C. Further, in this example: power supply unit 601A (which is located outside of zone A) provides power to only the group of seat nodes associated with seats 1A-1D (that is, those seats in zone A); power supply unit 601B (which is located outside of zone B) provides power to only the group of seat nodes associated with seats 2A-2D (that is, those seats in zone B); and power supply unit 601C (which is located outside of zone C) provides power to only the group of seat nodes associated with seats 3A-3D and 4A-4D (that is, those seats in zone C). In one specific example, each power supply unit may be located in the crown (overhead) area of the cabin or in an electronics bay. In another specific example, each power supply unit may be located below the floor.

In one example, each of zones A,B,C may be a different class of service (e.g., first class, business class, coach). In another example, each of zones A,B,C may have different levels of power permitted to be supplied by a given power supply unit (e.g., a power supply unit associated with first class may permit more power to be supplied to the respective seat nodes than a power supply unit associated with business class).

In another example, a given power supply may provide power to more than one zone, or to any desired combination(s) of seat(s) and/or zone(s). In another example, rules for prioritizing power utilization can be carried out in the power supply units or in the CMS.

In another example, there may be any desired number of outlets (e.g., 110 VAC outlets and/or USB outlets) per seat node and any desired number of seat node(s) per seat.

In another example implementation, only as much power conversion is put on the airplane as there is power source available. In another example, each power supply may be larger than a typical power supply. In one specific example, each power supply may be approximately 2,100 VA. In another example, as many outlets as possible may be connected to each power supply. In one specific example, for a 737, only 4,200 VA of conversion (e.g., 2 power supplies) may be required (this may be less than conventionally used and may contribute to a reduction in cost and/or weight (that is, by using less power conversion hardware)).

In another example, power management may be used to ensure that overcurrent protection in the converters is not tripped (as opposed to ensuring that the aircraft power source is not overloaded). In this example implementation, each converter operates separate from the other converters and is only tasked with protecting itself.

In another example implementation, an airplane may include a plurality of seat groups (each seat group being a frame with a particular number of seats (e.g., 3 seats)). Any desired number of power suppl(ies) may serve any desired number of seat group(s). Also, any desired number of seat node(s) may serve any desired number of seat group(s).

As described herein, various embodiments provide for a data network between the seat nodes and the power supply units, as well as a data network between the power supply units and the cabin management system. In one example, the data network can be via separate digital communication lines (such as, for example, RS-485, Ethernet, etc.). In another example, the data can be placed on a data-over-power network, thereby reducing aircraft wiring and wire weight. This further reduces installation time. In addition, by using a single power supply unit with multiple seat nodes, weight may be reduced (e.g. helping to save on fuel and operating costs).

In one specific example, the cabin management system to power supply unit data network would implement standard messaging, such as ARINC 628 Passenger Service System commands as well as ARINC 628 Power System Operational Mode commands.

In another embodiment, each seat node can communicate with other electronic component(s) over its digital data bus or busses. This allows the seat node to act as a gateway to collect BIT (Built-In Test) and fault information from the seat electronics, as well as allow the seat node to forward (such as from the CMS) any software updates to the electronic component(s). This would allow automatic software updates without the need for direct reprogramming of each seat electronic component by maintenance personnel.

As described herein is a power system (and corresponding methods) for providing power to a plurality of seats of an aircraft, wherein the aircraft includes a source of AC power. In one example, the power system comprises: a plurality of power supply units, each power supply unit being configured to receive power from the source of AC; and a power network configured to provide power to at least two of the seats from a single one of the power supply units. In one example, the power network is configured to provide power from each of the power supply units to a respective one of a plurality of groups of a plurality of the seats. In another example, each power supply unit is in a respective one of a plurality of zones (e.g., physically separated zones) of the aircraft.

As described herein is a power system (and corresponding methods) for providing power to a plurality of seats of an aircraft, wherein the aircraft includes a source of AC power. In one example, the power system comprises: a plurality of power supply units, the number of the power supply units being less than the number of seats to which power is provided; a first power network configured to provide power from the source of AC power to each of the power supply units; and a second power network configured to provide power from at least a first one of the power supply units to at least two of the seats. In one example, the second power network is configured to provide power from each of the power supply units to at least two of the seats. In another example: the seats to which power is provided are arranged into a plurality of zones, each of the zones consisting of some of the seats to which power is provided; each of the power supply units is associated with one of the zones; and the second power network is configured to provide power from each of the power supply units associated with one of the zones to a respective zone.

In another example, a given power supply unit may provide power exclusively to the seats within a given zone associated with the power supply unit (that is, in this example, a first power supply unit provides power exclusively to the seats within a first zone and a second power supply unit provides power exclusively to the seats within a second zone (wherein the seats in the first and second zone are mutually exclusive). Of course, this is just one example, and there need not be exclusivity between a particular power supply unit and particular seat(s) or zone(s).

As described herein, various embodiments may provide load management for a power system (e.g., passenger aircraft power load management). In one specific example, the load management may use a first in-first out control strategy (e.g., carried out by opening/closing circuits (physically and/or via use of semiconductors)). In another specific example, new loads may be connected by actively shedding old loads. Then, previously shed loads may be reconnected and other loads shed (in one specific example, all loads may be periodically cycled through). In another specific example, the load management may be carried out via a system which is digitally managed.

As described herein, various embodiments may provide intelligent load shedding based on operating time for each load. In one example, a cabin power system may be provided which monitors electrical loads used at the seats, keeps a history of the loads in memory, and uses that history to shed and share loads in a first-in, first-out basis (e.g., for use in providing equitable sharing of power).

In one specific example, a power system may utilize one or more microprocessors and digital communications. In another specific example, outlet(s) are not connected directly to power supply units (but, rather, through a seat node).

Those skilled in the art will appreciate that various embodiments provide more legroom for passengers and reduced weight via, e.g., via use of one or more data-over-power networks.

It will also be appreciated that various embodiments also provide means for full control and management of cabin power, and provide a gateway for access to BIT and fault data for seat-based electronics.

It will also be appreciated that various embodiments also provide a gateway to support dataloading via the data network(s).

In another example, a highly integrated yet flexible, adaptable, and scalable system is provided. Such a system may integrate seamlessly with other cabin systems (e.g., in-flight entertainment systems), may enhance passenger experience, may reduce crew workload, may provide diagnostics for efficient repair and/or may reduce operating costs.

In another example, conventional power boxes may be removed from under the seats (e.g., increasing passenger legroom) and/or from overhead bins.

In another example, various tasks of the flight crew may be simplified and/or reduced by being automated. In another example, the system may work with (e.g., seamlessly integrate with) the flight crew's personal electronic devices. In another example, the system may provide a user-friendly interface (e.g., requiring less time to learn). In another example, crew workload may be simplified through use of a common control panel.

In another example, the system may provide built-in monitoring capabilities to diagnose equipment failures so that maintenance personnel do not spend their time (or spend less time) troubleshooting hardware and/or software issues. In another example, the system may provide for a retrofit or forward fit solution. In another example, the system may provide for pay-for-power (e.g., in economy class).

In another embodiment, a power system for providing power within an aircraft, wherein the aircraft includes a source of AC power, is provided, the power system comprising: a plurality of seat nodes, each of the plurality of seat nodes being associated with one of a plurality of seats, each of the seat nodes being in one of a plurality of groups, wherein each group includes a plurality of seat nodes; a plurality of power supply units, each of the power supply units including a frequency converter, each frequency converter being configured to receive power from the source of AC power, each power supply unit being dedicated to a respective one of the groups of seat nodes; a power network configured to provide power from a first one of the power supply units to the seat nodes of a first one of the groups and to provide power from a second one of the power supply units to the seat nodes of a second one of the groups; and a first data network configured to communicate data from each seat node of the first group of seat nodes to the first power supply unit and to communicate data from each seat node of the second group of seat nodes to the second power supply unit.

In one example: the first power supply unit is configured to store information indicative of power usage (e.g., length of time) by the seat nodes of the first group; the second power supply unit is configured to store information indicative of power usage (e.g., length of time) by the seat nodes of the second group; the first power supply unit is configured to cause the seat nodes of the first group to shed loads on a first-in, first-out basis; and the second power supply unit is configured to cause the seat nodes of the second group to shed loads on a first-in, first-out basis.

In another example, at least some of the information indicative of power usage by the seat nodes of the first group is communicated to the first power supply unit by the seat nodes of the first group; and at least some of the information indicative of power usage by the seat nodes of the second group is communicated to the second power supply unit by the seat nodes of the second group.

In one embodiment, a power system for providing power within an aircraft, wherein the aircraft includes a source of AC power having a first frequency above 60 Hz is provided, the power system comprising: a plurality of seat nodes, each of the plurality of seat nodes comprising a microprocessor and an AC monitor and control element; a power supply unit, the power supply unit including a frequency converter subsystem, the frequency converter subsystem being configured to receive power from the source of AC power and to convert the received power having the first frequency into converted power having a second frequency at essentially 60 Hz; a power network configured to provide the converted power from the frequency converter subsystem of the power supply unit to the plurality of seat nodes, wherein the AC monitor and control element of each of the plurality of seat nodes is configured to monitor the converted power received from the frequency converter subsystem of the power supply unit and to control the received converted power as output power that is output from each of the plurality of seat nodes; and a data network configured to communicate data between the power supply unit and each of the plurality of seat nodes.

In one example, each AC monitor and control element comprises a relay.

In another example, the data network is formed by a data-over-power network that operates using the power network.

In another example, each of the plurality of seat nodes comprises at least one outlet.

In another embodiment, a method for providing power within an aircraft, wherein the aircraft includes a source of AC power having a first frequency above 60 Hz is provided, the method comprising: providing a plurality of seat nodes, each of the plurality of seat nodes comprising a microprocessor and an AC monitor and control element; providing a power supply unit, the power supply unit including a frequency converter subsystem, the frequency converter subsystem being configured to receive power from the source of AC power and to convert the received power having the first frequency into converted power having a second frequency at essentially 60 Hz; providing a power network configured to provide the converted power from the frequency converter subsystem of the power supply unit to the plurality of seat nodes, wherein the AC monitor and control element of each of the plurality of seat nodes is configured to monitor the converted power received from the frequency converter subsystem of the power supply unit and to control the received converted power as output power that is output from each of the plurality of seat nodes; and providing a data network configured to communicate data between the power supply unit and each of the plurality of seat nodes.

In one example, the data network is formed by a data-over-power network that operates using the power network.

It is noted that the foregoing has outlined some of the embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. Further, it is noted that all examples disclosed herein are intended to be illustrative, and not restrictive.

What is claimed is:

1. A power system for providing power within an aircraft, wherein the aircraft includes a source of AC power having a first frequency, the power system comprising:
  a power supply unit, the power supply unit including a frequency converter subsystem, the frequency converter subsystem being configured to receive power from the source of AC power and to convert the received power having the first frequency into converted power having a second frequency less than the first frequency, the power supply unit being configured to monitor total power consumed by a plurality of seat nodes;
  each of the plurality of seat nodes comprising a microprocessor and an AC monitor and control element, the AC monitor and control element of each of the plurality of seat nodes being configured to monitor the converted power received from the frequency converter subsystem of the power supply unit and to control the received converted power as output power that is output from each of the plurality of seat nodes, the output power from each of the plurality of seat nodes being individually selectively controlled based on the monitored total power consumed by the plurality of seat nodes;

a power network configured to provide the converted power from the frequency converter subsystem of the power supply unit to the plurality of seat nodes, wherein; and a data network configured to communicate data between the power supply unit and each of the plurality of seat nodes.

2. The system of claim 1, wherein each AC monitor and control element comprises at least ones relay for individually selectively controlling the output power from each of the plurality of seat nodes based on the monitored total power consumed by the plurality of seat nodes.

3. The system of claim 1, wherein the data network is formed by a bi-directional data-over-power network that operates using the power network.

4. The system of claim 1, wherein each of the plurality of seat nodes comprises at least one outlet.

5. A method for providing power within an aircraft, wherein the aircraft includes a source of AC power having a first frequency, the power system comprising:

supplying power having the first frequency from the source of AC power to a power supply unit having a frequency converter subsystem;

converting the received power having the first frequency into converted power having a second frequency less than the first frequency;

supplying the converted power from the frequency converter subsystem to a plurality of seat nodes;

monitoring by the power supply unit the total power consumed by the plurality of seat nodes;

monitoring at each of the plurality of seat nodes the converted power received from the frequency converter subsystem of the power supply unit; and controlling at each of the plurality of seat nodes the received converted power as output power that is output from each of the plurality of seat nodes, the output power from each of the plurality of seat nodes being individually selectively controlled based on the monitored total power consumed by the plurality of seat nodes.

6. The method of claim 5, wherein the data network is formed by a bi-directional data-over-power network that operates using the power network.

7. The method of claim 5, further comprising controlling at least one relay for individually selectively controlling the output power from each of the plurality of seat nodes based on the monitored total power consumed by the plurality of seat nodes.

8. The system of claim 3, wherein each of the plurality of seat nodes includes a AC/DC converter configured to perform as a data-over-power interface between the power supply unit and the seat node.

9. A power system for providing power within an aircraft, wherein the aircraft includes a source of AC power having a first frequency above 60 Hz, the power system comprising:

a plurality of seat nodes, each of the plurality of seat nodes comprising a microprocessor and an AC monitor and control element;

a power supply unit, the power supply unit including a frequency converter subsystem, the frequency converter subsystem being configured to receive power from the source of AC power and to convert the received power having the first frequency into converted power having a second frequency at essentially 60 Hz;

a power network configured to provide the converted power from the frequency converter subsystem of the power supply unit to the plurality of seat nodes, wherein the AC monitor and control element of each of the plurality of seat nodes is configured to monitor the converted power received from the frequency converter subsystem of the power supply unit and to control the received converted power as output power that is output from each of the plurality of seat nodes; and a data network configured to communicate data between the power supply unit and each of the plurality of seat nodes, the data network being a bi-directional data-over-power network that operates using the power network.

10. The power system of claim 9, wherein each of the plurality of seat nodes includes a AC/DC converter configured to perform as a data-over-power interface between the power supply unit and the seat node.

* * * * *